United States Patent
Pishe

(10) Patent No.: US 11,687,542 B2
(45) Date of Patent: *Jun. 27, 2023

(54) TECHNIQUES FOR IN-MEMORY DATA SEARCHING

(71) Applicant: Visa International Service Association, San Francisco, CA (US)

(72) Inventor: Naveen Pishe, San Ramon, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,290

(22) Filed: Jan. 6, 2022

(65) Prior Publication Data

US 2022/0129455 A1 Apr. 28, 2022

Related U.S. Application Data

(63) Continuation of application No. 16/476,002, filed as application No. PCT/US2017/021953 on Mar. 10, 2017, now Pat. No. 11,250,011.

(51) Int. Cl.
*G06F 16/00* (2019.01)
*G06F 16/2458* (2019.01)
(Continued)

(52) U.S. Cl.
CPC ........ *G06F 16/2471* (2019.01); *G06F 16/134* (2019.01); *G06F 16/2282* (2019.01); *G06F 16/2255* (2019.01)

(58) Field of Classification Search
CPC .............. G06F 16/134; G06F 16/2255; G06F 16/2282; G06F 16/2471
See application file for complete search history.

(56) References Cited

U.S. PATENT DOCUMENTS 8,904,047 B1 12/2014 Kornfeld et al.
9,178,698 B1 11/2015 Jarjur et al.
(Continued)

FOREIGN PATENT DOCUMENTS

CN 102375853 A 3/2012
CN 102394923 3/2012
(Continued)

OTHER PUBLICATIONS

"GitHub—OpenHFT/Chronicle-Map: Replicate Your Key Value Store Across your Network, with Consistency, Persistence and Performance", Available Online at, :https://web.archive.org/web/20160210211221/https://github.com/OpenHFT/Chronicle-Map, Feb. 10, 2016, 14 pages.
(Continued)

*Primary Examiner* — Diedra McQuitery
(74) *Attorney, Agent, or Firm* — Kilpatrick Townsend & Stockton LLP

(57) ABSTRACT

One embodiment of the invention is directed to a method for performing efficient data searches in a distributed computing system. The method may comprise, receiving a search request including a key. The key may be provided to a block-based table manager via a programming interface external to a virtual machine executing on a computer system. The programming interface may provide a translation between a first programming framework of the virtual machine and a second programming framework of the block-based table manager. Providing the key may cause the block-based table manager to conduct a search for a value corresponding to the key. The value may be provided in response to the search request. Utilizing such block-based tables may enable a data search to be performed using on-board memory of computing node operating within a distributed computing system.

20 Claims, 7 Drawing Sheets

(51) Int. Cl.
*G06F 16/22* (2019.01)
*G06F 16/13* (2019.01)

(56) References Cited

U.S. PATENT DOCUMENTS

| | | | |
|---|---|---|---|
| 10,474,656 B1* | 11/2019 | Bronnikov | G06F 16/217 |
| 2010/0199109 A1 | 8/2010 | Terek et al. | |
| 2012/0246190 A1 | 9/2012 | Surtani et al. | |
| 2013/0067190 A1 | 3/2013 | Gissel et al. | |
| 2013/0103729 A1 | 4/2013 | Cooney et al. | |
| 2013/0173872 A1 | 7/2013 | Terek et al. | |
| 2015/0074115 A1 | 3/2015 | Vasu et al. | |
| 2016/0026684 A1* | 1/2016 | Mukherjee | G06F 3/067 |
| | | | 707/713 |
| 2016/0196217 A1 | 7/2016 | Chiu et al. | |
| 2017/0147231 A1* | 5/2017 | Jung | G06F 3/067 |
| 2017/0177636 A1* | 6/2017 | Nguyen | G06F 16/2255 |
| 2017/0195415 A1* | 7/2017 | Versteeg | H04L 67/306 |

FOREIGN PATENT DOCUMENTS

| | | |
|---|---|---|
| CN | 102713904 A | 10/2012 |
| CN | 103268318 A | 8/2013 |
| CN | 104813276 A | 7/2015 |
| WO | 2014106418 | 7/2014 |

OTHER PUBLICATIONS

U.S. Appl. No. 16/476,002, Non-Final Office Action, dated Jun. 14, 2021, 11 pages.
U.S. Appl. No. 16/476,002, Notice of Allowance, dated Oct. 20, 2021, 12 pages.
Application No. EP17899515.5, Extended European Search Report, dated Nov. 19, 2019, 13 pages.
Application No. PCT/US2017/021953, International Search Report and Written Opinion, dated Dec. 5, 2017, 11 pages.
Application No. EP17899515.5, Office Action, dated Mar. 3, 2021, 7 pages.
EP17899515.5, "Summons to Attend Oral Proceedings", Aug. 23, 2022, 13 pages.
EP17899515.5, "Summons to Attend Oral Proceedings", Sep. 9, 2022, 2 pages.
Ferragina et al., "On Compressing and Indexing Data", Available Online at: URL:https://www.researchgate.net/publication/2927187_On_Compressing_And_Indexing_Data, Feb. 28, 2002, 5 pages.
Application No. PCT/US2017/021953, International Preliminary Report on Patentability, dated Sep. 19, 2019, 8 pages.
Office Action, dated Apr. 4, 2023, in Chinese Patent Application No. CN201780088264, with English translation, 26 pages.

* cited by examiner

TECHNIQUES FOR IN-MEMORY DATA SEARCHING

CROSS-REFERENCE TO RELATED APPLICATION

This application is a Continuation of U.S. patent application Ser. No. 16/476,002 filed Jul. 3, 2019, which is the US national stage of PCT/US2017/021953, filed Mar. 10, 2017, the disclosures of which are incorporated herein by reference in their entirety.

BACKGROUND

Distributed computing systems are often used for managing and processing large data sets. A distributed computing system may distribute a database on several computers, the computers communicating with one other through various communication media, such as high-speed networks. Distributed database systems may consist of a single logical database which may be split into different fragments, each fragment being stored on a single computer (e.g., a node) of the distributed computing system. Distributed computing systems may present challenges regarding how the large data set is managed and/or accessed. For example, the exchange of information and additional computations required to coordinate tasks between computers are a form of overhead that does not arise in centralized systems. Additionally, a distributed computing system may be prone for errors since it is more difficult to ensure correctness of algorithms when the data set is spread over many computers of the distributed computing system. Additionally, searching the distributed computing system for a specific portion of the data set may be computationally expensive and may result in variable search times. Accordingly, improvements may be made to the data set and the distributed computing system to provide more efficient search times.

Current techniques for performing key searches may present drawbacks resulting from search collisions as many devices may be accessing the container at the same time. To avoid collisions, requests may be serially performed which results in longer computing times. Additionally, data sets and/or data set containers may be too large (e.g., 5 TB) to load into memory (e.g., 128 GB of random access memory (RAM)) of a node in a distributed computing system, so they are often stored in a centralized location. Thus, searching for a key in these scenarios may be computationally extensive as the size of the data being searched is large and many systems may be attempting to access the data at the same time. Accordingly, improvements may be made to the data set and the distributed computing system to provide more efficient search times.

Embodiments of the invention address these and other problems, individually and collectively.

BRIEF SUMMARY

One embodiment of the invention is directed to a method comprising generating, by a data set preparation module executed by a virtual machine hosted by a computer system, a set of key-value pairs based at least in part on a data set. The method may further comprise providing, by the data set preparation module, the set of key-value pairs to a block-based table manager. In some embodiments, the block-based table manager may be executed by the computer system in an execution environment outside of the virtual machine. The data set preparation module may interact with the block-based table manager utilizing a programming interface configured at least to enable modules executing within the virtual machine to access functionality external to the virtual machine. In some embodiments, providing the set of key-value pairs to the block-based table manager may cause the block-based table manager to generate a plurality of data blocks containing data collectively representing a block-based table. The method may further comprise distributing, by the computer system, the block-based table to a plurality of computer systems distinct from the computer system.

Another embodiment of the invention is directed to a system that comprises a first computing device and a second computing device. The first computing device may comprise a first processor, and a first computer readable medium coupled to the first processor, the first computer readable medium comprising code, executable by the first processor, for implementing a first method. The first method may comprise generating, by a data set preparation module executed by a virtual machine hosted by a computer system, a set of key-value pairs based at least in part on a data set. The method may further comprise providing, by the data set preparation module, the set of key-value pairs to a block-based table manager. In some embodiments, the block-based table manager may be executed by the computer system in an execution environment outside of the virtual machine. The data set preparation module may interact with the block-based table manager utilizing a programming interface configured at least to enable modules executing within the virtual machine to access functionality external to the virtual machine. In some embodiments, providing the set of key-value pairs to the block-based table manager may cause the block-based table manager to generate a plurality of data blocks containing data collectively representing a block-based table. The method may further comprise distributing, by the computer system, the block-based table to a plurality of computer systems distinct from the computer system.

The second computing device may comprise a second processor, and a second computer readable medium coupled to the second processor, the second computer readable medium comprising code, executable by the second processor, for implementing a second method. The second method may comprise receiving, at a remote computer system of the plurality of computer systems by a search processing module executed by a separate virtual machine hosted by the remote computer system, a search request including a key. The second method may further comprise providing, by the search processing module, the key to a block-based table manager, the block-based table manager being executed by the remote computer system in an execution environment outside of the separate virtual machine. In some embodiments, the search processing module may interact with the block-based table manager utilizing a separate programming interface configured at least to enable modules executing within the separate virtual machine to access functionality external to the separate virtual machine. In some embodiments, providing the key to the block-based table manager may cause the block-based table manager to conduct a search for its corresponding value. The second method may further comprise receiving, by the search processing module, the value corresponding to the key from the block-based table manager. The second method may further comprise providing, by the search processing module, the value in response to the search request.

Another embodiment of the invention is directed to a computing device that comprises a processor, and a computer readable medium coupled to the processor, the computer readable medium comprising code, executable by the processor, for implementing a method. The method may comprise generating, by a data set preparation module executed by a virtual machine hosted by the computing device, a set of key-value pairs based at least in part on a data set. The method may further comprise providing, by the data set preparation module, the set of key-value pairs to a block-based table manager. In some embodiments, the block-based table manager may be executed by the computing device in an execution environment outside of the virtual machine. The data set preparation module may interact with the block-based table manager utilizing a programming interface configured at least to enable modules executing within the virtual machine to access functionality external to the virtual machine. In some embodiments, providing the set of key-value pairs to the block-based table manager may cause the block-based table manager to generate a plurality of data blocks containing data collectively representing a block-based table. The method may further comprise distributing, by the computing device, the block-based table to a plurality of computer devices distinct from the computing device.

These and other embodiments of the invention are described in further detail below.

DETAILED DESCRIPTION

Figure 1:
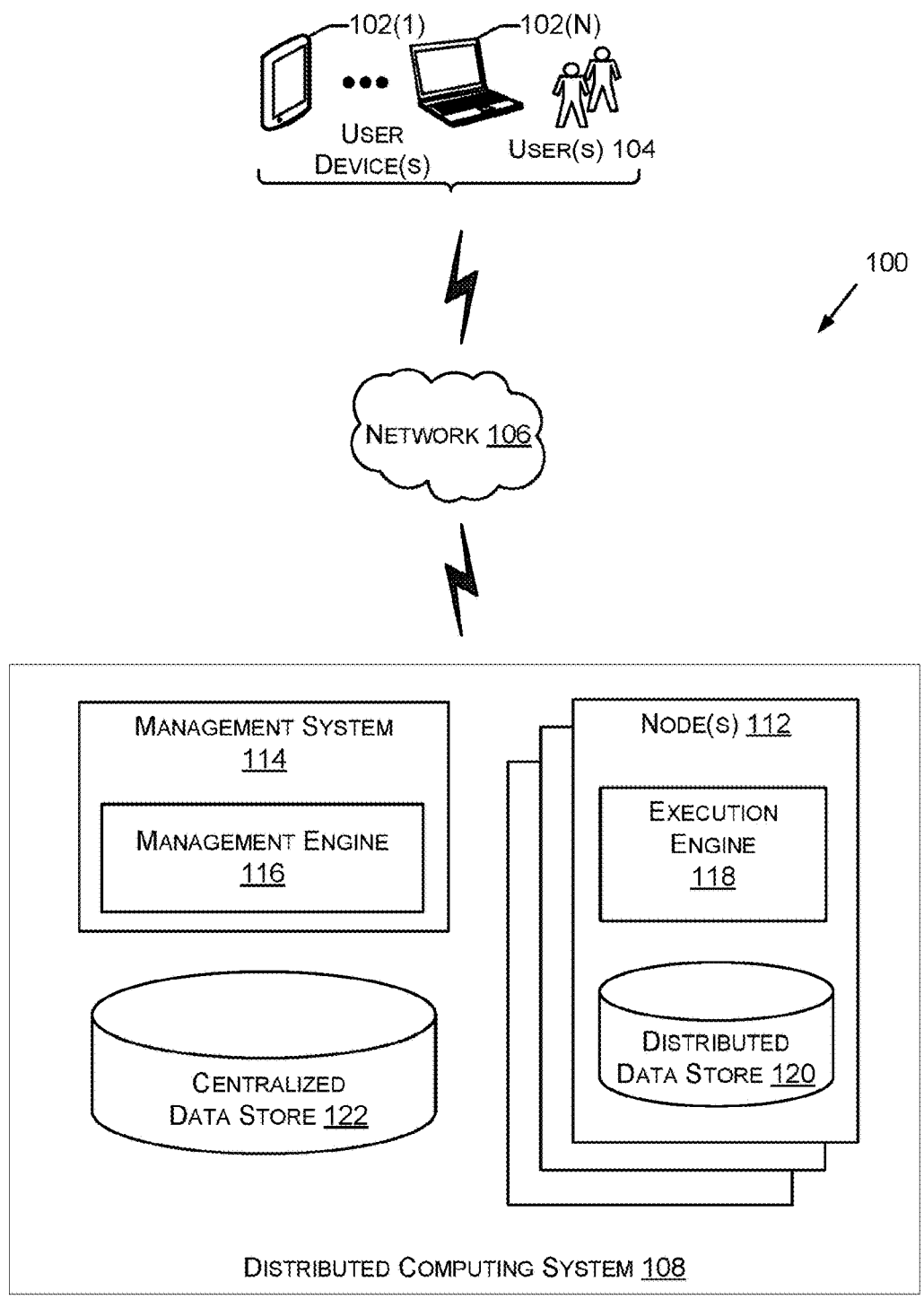
FIG. 1 depicts an example distributed computing environment in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

A "distributed computing system" may refer to a collection of electronic devices communicatively coupled with one another. In some embodiments, a block-based table may be distributed amongst the distributed computing system (e.g., on memory within nodes of the system). The collection of electronic devices may be utilized to perform various functions (e.g., tasks). In some examples, the collection of electronic devices may include one or more nodes and/or one or more distributed databases.

A "management system" may be one or more electronic devices that may be used to manage other devices. For example, the management system may manage one or more computing devices (e.g., nodes) in a distributed computing system. A management system, in some examples, may be responsible for dispatching work (e.g., storage tasks, search tasks) to one or more other computing devices (e.g., nodes) in the distributed computing system. In some examples, a management system may be configured to cause data preparation tasks to be performed with a data set. For example, a management system may be configured to execute one or more virtual machines (e.g., a Java Virtual Machine (JVM)) that individually perform one or more tasks for preparing a data set to be stored on one or more computing devices (e.g., nodes). The management system may be a node in a distributed computing system, or the management system may be communicatively coupled to a distributed computing system. The management system may be configured to transmit information (e.g., distribution requests and/or search requests) to various computing devices (e.g., nodes) in the distributed computing system, and may receive information (e.g., response messages) from the various nodes on completion of the corresponding task(s) or at another suitable time.

A "node" may be an electronic device that may be used to process data (e.g., tasks) in a distributed computing system. In some examples, a node may receive information (e.g., a distribution request, a search request, etc.) from a management system. The node may be responsible for performing various operations in order to perform a function (e.g., store data, lookup data, etc.). During request processing, or at another suitable time, the node may transmit information (e.g., a response message) to another node in the distributed computing system and/or to the management system. In at least some example, the node may include some amount (e.g., 128 gigabytes (GB), 1 terabyte (TB), etc.) of on board memory (e.g., RAM) from which it may utilize during processing.

"Transaction processing data" may include data associated with a transaction. It may refer to any suitable data associated with a key. In some embodiments, transaction processing data may be payment account data associated with a user. In some embodiments, transaction processing data may include a shipping address, billing address, or other pertinent information associated with a consumer. In some examples, transaction processing data may include one or more account identifiers. In some embodiments, the account identifier may be a payment card number (PAN) and/or primary account number. A PAN may be 14, 16, or 18 digits. Transaction processing data may also include an expiration date associated with an account, as well as a service code and/or verification values (e.g., CVV, CVV2, dCVV, and dCVV2 values). Transaction processing data may additionally, or alternatively, include past purchase information, navigational information related to website usage, fraudulent transaction rules associated with an account, or any suitable data for which a search may be conducted. Such data may, or may not, pertain to a consumer account/transaction.

A "distribution request" is an electronic message that may include any suitable information necessary for distributing data (e.g., transaction processing data, fraudulent transaction protocol set(s), etc.). In some embodiments, the distribution request may be directed to a management system of a distributed computing system and/or between nodes of the distributed computing system. In some embodiments, a distribution request may include one or more data set identifiers associated with one or more data sets to be distributed. In some examples, the distribution request may further include a storage capacity value of at least one node of the distributed computing system.

A "search request" is an electronic message that may include any suitable information necessary for searching data (e.g., transaction processing data, fraudulent transaction protocol set(s), etc.). In some embodiments, the search request may be directed to a management system of a distributed computing system, to a node of the distributed computing system, and/or between nodes of a distributed computing system. In some embodiments, a search request may include one or more data set identifiers associated with one or more data sets to be searched. The search request may further include a key corresponding to a key/value pair associated with a data set.

A "response message" may include any suitable information necessary for providing response data. In some embodiments, the response data may relate to a distribution request and/or a search request. For example, the response message may include the data requested (e.g., transaction processing data corresponding to an account identifier) from a search request. In some examples, the response message may include an indication that the distribution/search was successful or unsuccessful.

A "virtual machine" may be an abstract computing machine, running on a host machine, that enables the host machine to run a program. In some examples, a virtual machine may be configured to execute a program that is compiled in a particular programming environment (e.g., Java Runtime Environment (JRE)). In some cases, a virtual machine may include functionality that enables a library associated with a native application to be loaded, or an application programming interface library to be loaded, such that functionality of the native library is callable from the virtual machine. As a non-limiting example, a virtual machine may be a Java Virtual Machine (JVM) that includes a Java Native Interface (JNI) programming framework that enables a native library/native API to be loaded by the JVM. By utilizing the JNI framework, the Java code running in JVM is enabled to call and be called by native applications (programs specific to a hardware and operating system platform such as a block-based table manager) and libraries written in other languages such as C, C++ and assembly.

A "block-based table manager" may be an example of a native application. In some embodiments, a block-based table manager may be configured to perform data preparation tasks with a data set. For example, a block-based table manager may generate one or more data blocks for storing one or more portions of a data set. Additionally, a block-based table manager may maintain metadata for the block-based table that identifies particular locations (e.g., a particular data block) within which a value is stored that is associated with a given key. A block-based table manager may execute one or more compression algorithms to compress one or more data blocks such that the data blocks require less storage space. A block-based table manager may further be configured to utilize the metadata and the block-based tables to perform searching procedures to retrieve a data value corresponding to a given key.

A "block-based table" is intended to refer to metadata and one or more data blocks that collectively represent a data table. Each data block of a block-based table may be compressed to utilize less memory than an uncompressed data block. The metadata of the block-based table may maintain an association between a particular key and a particular data block that stores the value corresponding to the particular key.

A "data block" may be a fixed-size storage container. In some cases, the default block size may be 4k, although any suitable block size may be utilized. Within a data block, a number of data entries may be stored. In some examples, a data block is compressible such that a compressed data block requires less memory than an uncompressed data block.

A "user device" may be an electronic device that is operated by a user. Examples of user devices may include a mobile phone, a smart phone, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "processor" may refer to any suitable data computation device or devices. A processor may comprise one or more microprocessors working together to accomplish a desired function. The processor may include CPU comprises at least one nigh-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Details of some embodiments of the present invention will now be described.

As distributed computing systems are widely used to manage large data sets, the ability to perform efficient searches is of tantamount concern. In current systems, a database may be replicated on each node of the distributed computing system while in other examples, a master database may be accessible by each node of the distributed computing system. However, each approach presents challenges. For example, replicating a database on each node of a distributed computing system may only be performed when the database is small enough to be stored on a node. Additionally, maintaining a master database on disk may result in variable search times as the data set is large and difficult to search. What is required is a method of managing a distributed data set among a set of nodes in a distributed computing system while simultaneously providing a more efficient searching solution.

Embodiments of the inventions are directed to methods and systems that may be utilized to provide efficient data searches within a distributed computing system. Utilization of the techniques described herein enables the distributed computing system to distribute a data set to local memory (e.g., RAM) of the set of nodes in order to provide improved efficiency when performing data searches. Additionally, the techniques described herein enable a large data set to be compressed to fit within in local memory (e.g., RAM) on individual nodes of the distributed computing system, which in turn, enables faster searches to be performed on the data set than if the search was performed utilizing a centralized database.

In some embodiments, the system may receive a distribution request that specifies a data set and/or location of a data set to be distributed. The system may utilize a virtual machine to provide data set preparation tasks. The virtual machine may be executed/hosted by the system. Upon receipt of the distribution request, the system may cause a virtual machine to utilize a programming interface configured to enables modules executing with the virtual machine to access functionality external to the virtual machine. By way of example, a virtual machine may utilize a programming interface to access native application functionality of a block-based table manager (e.g., rocksDB®) to perform data preparation techniques with the data set. For example, the native functionality may cause one or more data structures (e.g., one or more data blocks representing a block-based table) to be created to store the data set. The block-based table manager may maintain metadata associated with the data structure that identifies a location (e.g., a particular block-based table) where particular a data value resides. For example, the metadata may indicate a particular data block that stores a value corresponding to a given key.

In at least one embodiment, the system (e.g., a distributed computing system) may receive a search request for a data value (e.g., transaction processing data) associated with a key (e.g., an account identifier, an alphanumeric value, etc.). The search request may be received by a module of a management system of a distributed system and, in some cases, distributed to a node of the distributed system. The management system and/or node may utilize programming interface of the virtual machine (the same or a different virtual machine as the one discussed above) to call native application functionality associated with searching a block-based table. For example, the key may be provided to the native application (e.g., the block-based table manager) utilizing the programming interface provided by the virtual machine. The block-based table manager may return the corresponding data value associated with the key as output. The management system and/or node may provide the returned data value in response to the search request.

FIG. 1 depicts an example distributed computing environment 100 in accordance with at least some embodiments. The distributed computing environment 100 may comprise one or more user devices 102(1)-102(N) (hereinafter "the user devices 102) operated by users 104. The user devices 102 may also be in communication, via network 106, with distributed computing system 108. The user devices 102 may be operable by one or more of the users 104 to access the distributed computing system 108 via the network 106. The user devices 102 may be any suitable device capable of communicating with the network 106. For example, the user devices 102 may be any suitable computing device such as, but not limited to, a mobile phone, a smart phone, a personal digital assistant (PDA), a laptop computer, a thin-client device, a tablet PC, a desktop computer, a set-top box, or other computing device.

The distributed computing system 108 may have any suitable characteristics. The distributed computing system 108 may include any suitable combination of one or more management systems (e.g., the management system 114), one or more computing nodes (e.g., node(s) 112), and one or more centralized data stores (e.g., a centralized data store 122) for performing the functionality described herein. The management engine 116 may operate as part of the management system 114. An example management system is described in more detail below in connection with FIG. 2. The management system 114 and the node(s) 112 may be communicatively coupled to one another. Similarly, the node(s) 112 may be communicatively coupled to each other. The management system 114, in conjunction with a data process, may include a management engine 116 that is configured to perform functionality including receiving and processing distribution and/or search requests, receiving/processing/transmitting response messages, and interfacing with a native application (e.g., a block-based table manager) to cause one or more data structures to be maintained on the node(s) 112. It should be appreciated that the management system 114, in some cases, may operate, in whole or in part, as part of one or more of the node(s) 112. Each task performed by the management system 114 may be executed by a virtual machine hosted by the management system 114.

The node(s) 112, in conjunction with a data process, may include an execution engine 118. The execution engine 118 may be configured to receive distribution and/or search requests, transmit response messages, and interface with a native application (e.g., a block-based table manager) to access one or more data structures (e.g., a block-based table including metadata and any suitable number of data blocks) corresponding to a larger data set. The node(s) 112 may further include a distributed data store 120. The distributed data store 120 may be configured to store the one or more data structures associated with a larger data set and/or any suitable information. For example, the distributed data store 120 may be configured to store one or more block-based tables. In at least one example, the distributed data store 120 may be random access memory (RAM) of the node(s) 112.

The distributed computing system 108 may further include a centralized data store (e.g., the centralized data store 122). The centralized data store may be configured to store one or more data sets. In at least one embodiment, the centralized data store 122 may be accessible by the management system 114 and/or the node(s) 112.

Messages between the computers, networks, and devices in FIG. 1 may be transmitted using a secure communications protocols such as, but not limited to, File Transfer Protocol (FTP); HyperText Transfer Protocol (HTTP); Secure HyperText Transfer Protocol (HTTPS), Secure Socket Layer (SSL), ISO (e.g., ISO 8583) and/or the like.

Each of the entities in FIG. 1 may communicate through any suitable communication channel or communications network (e.g., the network 106). A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Figure 2:
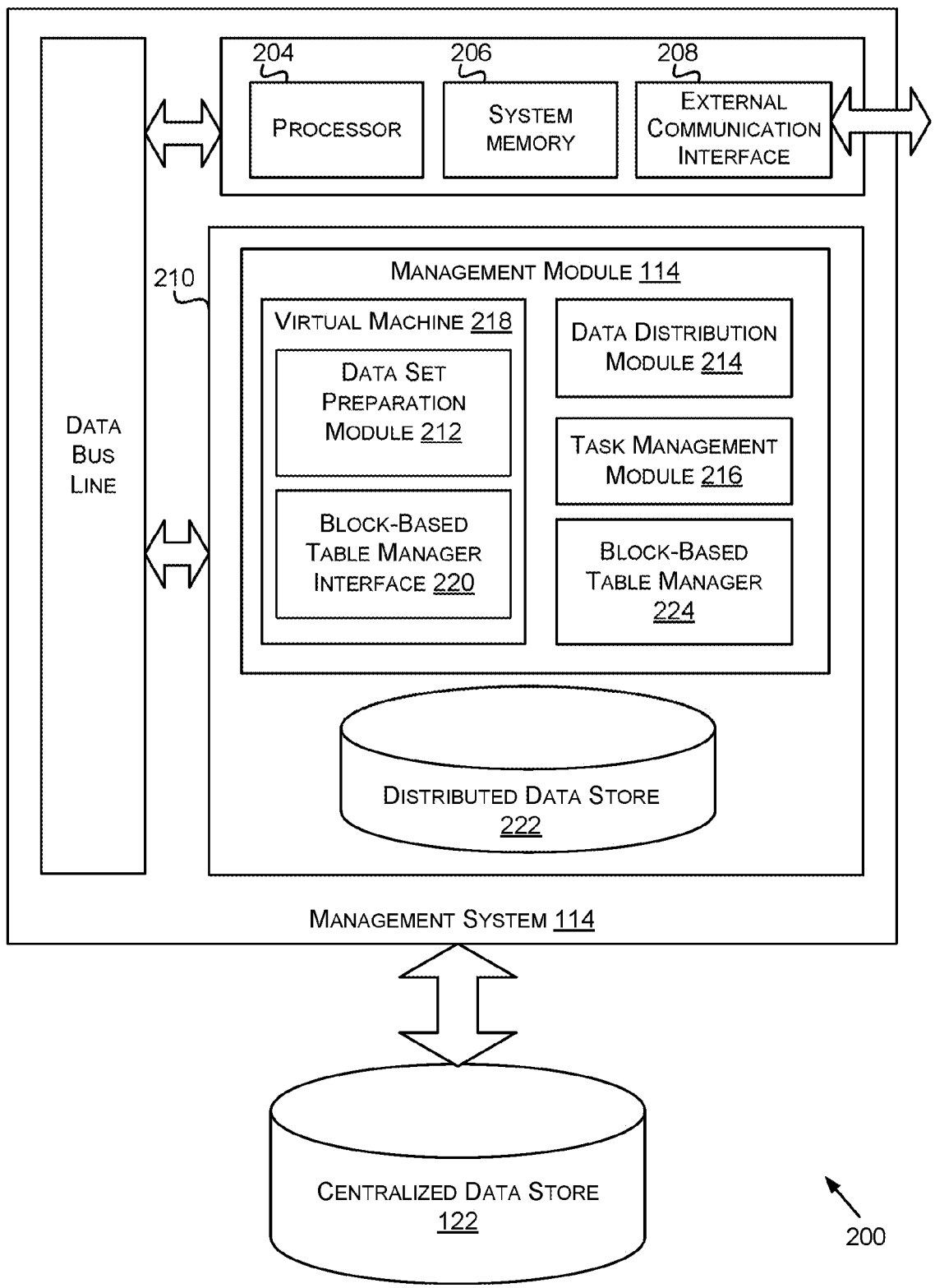
FIG. 2 depicts an example computer architecture capable of implementing at least some embodiments of a management system according to some embodiments.

FIG. 2 depicts an example computer architecture 200 capable of implementing at least some embodiments of a management system (e.g., the management system 114 of FIG. 1) of a distributed computing system (e.g., the distributed computing system 108 of FIG. 1). The management system 114 may individually include a processor 204 and a computer readable medium 210 coupled to the processor 204, the computer readable medium comprising code, and executable by the processor 204 for performing the functionality described herein. It should be appreciated that any functionality described with respect to the modules of FIG. 2 may be combined to be performed by a single module or may be performed by a module that is external to the management system 114. Additionally, it should be appreciated that any module or functionality performed by a module discussed with respect to FIG. 2 may be executed by a virtual machine hosted by the management system 114. The management system 114 may be configured to host any suitable number of virtual machines that may execute functionality for any suitable number of tasks.

FIG. 2 shows the management system 114 communicatively couple to the centralized data store 122. The centralized data store 122 may be configured as depicted in FIG. 2, or the centralized data store 122 may be provided, in whole or in part, as part of the management system 114.

The distributed data store 222, the centralized data store 122 (as well as any other database described herein) may be a conventional, fault tolerant, relational, scalable, secure database such as Oracle™ or Sybase™. The distributed data store 222 and/or the centralized data store 122 may be implemented using various data structures, such as an array, hash map, (linked) list, block-based tables, structured text file (e.g., XML), table, and/or the like. Such data structures may be stored in memory and/or in structured files.

The management system 114 may comprise a processor 204, which may be coupled to a system memory 206 and an external communication interface 208. A computer readable medium 210 may also be operatively coupled to the processor 204.

The computer readable medium 210 may comprise a number of software modules including a data set preparation module 212, a data distribution module 214 and a task management module 216. The computer readable medium 210 may comprise one or more virtual machines (e.g., the virtual machine 218) that are executed by the processor 204. More or fewer modules may be utilized to perform the functionality described herein.

The virtual machine 218 may be an abstract computing machine, running on the management system 114, that executes the data set preparation module. The virtual machine 218 may configured to provide a programming interface (e.g., the block-based table manager interface 220, an example of JNI) that provides translation between a programming framework of the virtual machine (e.g., Java) and a programming framework of a native application (e.g., the block-based table manager 224, a non-Java-based application). In some examples, the virtual machine 218 may include functionality that enables a library and/or application programming interface library associated with a native application (e.g., the block-based table manager 224) to be loaded such that functionality of the native application is callable from the virtual machine. As a non-limiting example, a virtual machine may be a Java Virtual Machine (JVM) that includes a Java Native Interface (JNI) programming framework that enables a native library/native API corresponding to the block-based table manager 224 to be loaded by the JVM. By utilizing the JNI framework, the Java code running in JVM is enabled to call and be called by native applications (programs specific to a hardware and operating system platform such as a block-based table manager).

The data set preparation module 212 may comprise code, that when executed within the virtual machine 218, causes the processor 204 to generate a set of key-value pairs from a data set. The data set preparation module 212 may cause the processor 204 to provide the key-value pairs to the block-based table manager 224 utilizing the block-based table manager interface 220. The block-based table manager 224 may be executing on the management system 114 outside of the execution environment of the virtual machine 218. Without utilizing the block-based table manager interface 220, the functionality of the block-based table manager 224 would be inaccessible to the virtual machine 218 and the data set preparation module 212. By utilizing the block-based table manager interface 220, the virtual machine is enabled to cause the processor 204 to execute functionality of a native application (e.g., the block-based table manager 224).

In some embodiments, the key-value pairs may be utilized by the block-based table manager 224 to generate one or more data blocks containing data that collectively represents a block-based table. In some cases, the data blocks may be compressed. The block-based table manager 224 may maintain metadata associated with block-based tables. The metadata may identify an association between a given key and a particular data block. In at least one example, the block-based table manager 224 may provide one or more block-based tables (e.g., to the data set preparation module 212) via the block-based table manager interface 220. The data set preparation module 212 (and/or the block-based table manager 224) may be configured to cause the one or more block-based tables to be stored in the distributed data store 120.

In some embodiments, the data set preparation module 212 may be configured to cause the processor 204 to provide the block-based table(s) to the data distribution module 214, a component of the management system 114. The data distribution module 214 may be configured to cause the processor 204 to store the one or more block-based tables in the distributed data store 120. Additionally, or alternatively, the data distribution module 214 may be configured to cause the processor 204 to distribute the block-based table(s) (including the data blocks and/or metadata) to the node(s) 112. According to some embodiments, distributing the block-based table(s) includes providing a copy to each node in a distributed computing environment. Upon receipt, the node may be configured to store the received block-based table(s) in local memory.

In some embodiments, the task management module 216 may be configured to receive search requests for a key associated with a data set for which a block-based table has been generated. The task management module 216 may be configured to cause the processor 204 to provide a search request (e.g., a search task) to one or more of the node(s) 112 for further processing. The task management module 216 may utilize standard load balancing techniques for distributing tasks (e.g., search tasks) between the node(s) 112 of a distributed computing environment. The task management module 216 may be further configured to cause the processor 204 to receive response messages from the node(s) 112 corresponding to data returned in response to a given search request (e.g., the value corresponding to the key). In some embodiments, the task management module 216 may be configured to provide the returned data in a response message corresponding to a previously-received search request.

Figure 3:
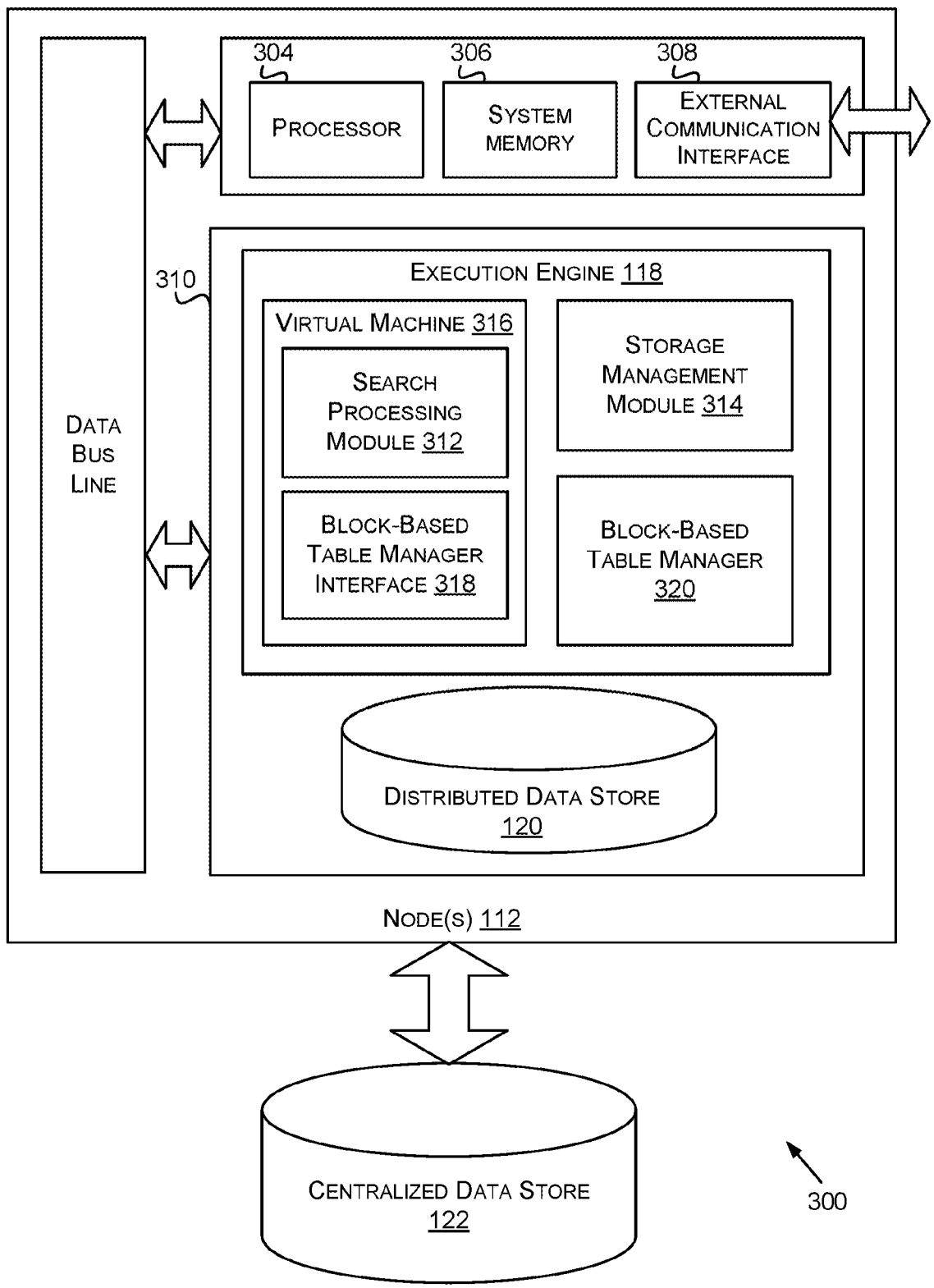
FIG. 3 shows an example computer architecture capable of implementing at least some embodiments of an execution engine of a distributed computing system.

FIG. 3 depicts an example computer architecture 300 capable of implementing at least some embodiments of a node (e.g., the node(s) 112 of FIG. 1) of the distributed computing system 108 of FIG. 1. The node(s) 112 may individually include a processor 304 and a computer readable medium 310 coupled to the processor 304, the computer readable medium 310 comprising code, executable by the processor 304 for performing the functionality described herein. It should be appreciated that any functionality described with respect to the modules of FIG. 3 may be combined to be performed by a single module or may be performed by a module that is external to the node(s) 112. Additionally, it should be appreciated that any module or functionality performed by a module discussed with respect to FIG. 2 may be executed by a virtual machine hosted by the management system 114. The management system 114 may be configured to host any suitable number of virtual machines that may execute functionality for any suitable number of tasks.

FIG. 3 shows the node(s) 112 communicatively couple to the centralized data store 122. The centralized data store 122 may be configured as depicted in FIG. 3, or the centralized data store 122 may be provided, in whole or in part, as part of the node(s) 112. The distributed data store 120 may be implemented using various data structures, such as an array, hash map, (linked) list, block-based tables, structured text file (e.g., XML), table, and/or the like. Such data structures may be stored in memory and/or in structured files.

The node(s) 112 may comprise the processor 204 (one or more processors), which may be coupled to a system memory 306 and an external communication interface 308. A computer readable medium 310 may also be operatively coupled to the processor 304.

The computer readable medium 310 may comprise a number of software modules including a search processing module 312 and a storage management module 314. The computer readable medium 310 may comprise one or more virtual machines (e.g., the virtual machine 316) that are executed by the processor 204. More or fewer modules may be utilized to perform the functionality described herein.

The virtual machine 316 may be an abstract computing machine, running on the node(s) 112, that executes the search processing module 312. The virtual machine 316 may configured to provide a programming interface (e.g., the block-based table manager interface 318, an example of JNI) that provides translation between a programming framework of the virtual machine (e.g., Java) and a programming framework of a native application (e.g., the block-based table manager 320, a non-Java-based application). In some examples, the virtual machine 316 may include functionality that enables a library and/or application programming interface library associated with a native application to be loaded such that functionality of the native application is callable from the virtual machine. As a non-limiting example, a virtual machine may be a Java Virtual Machine (JVM) that includes a Java Native Interface (JNI) programming framework that enables a native library/native API corresponding to the block-based table manager 320 to be loaded by the JVM. By utilizing the framework, the Java code running in JVM is enabled to call and be called by native applications (programs specific to a hardware and operating system platform such as a block-based table manager).

The search processing module 312 may comprise code, that when executed within the virtual machine 316, causes the processor 304 to receive a search request (e.g., from the task management module 216 of FIG. 2) including a key. The search processing module 312 may cause the processor 304 to provide the key- to the block-based table manager 320 utilizing the block-based table manager interface 318. The block-based table manager 320 may be executing on the node(s) 112 outside of the execution environment of the virtual machine 316. Without utilizing the block-based table manager interface 318, the functionality of the block-based table manager 320 would be inaccessible to the virtual machine 316 and the search processing module 312. By utilizing the block-based table manager interface 318, the virtual machine 316 is enabled to cause the processor 204 to execute functionality of a native application (e.g., the block-based table manager 320).

As a non-limiting example, the virtual machine 316 may provide one or more keys to a block-based table manager 320 via the block-based table manager interface 318. The key(s) may be utilized by the block-based table manager 320 to identify a data block of the block-based table corresponding to the key. The data block may be identified from metadata associated with a block-based table. The block-based tables (e.g., metadata and any suitable number of corresponding data blocks) can be stored in the distributed data store 120 (e.g., RAM of the node(s) 112). The block-based table manager 320 may execute a search query against the identified data block to retrieve the data value corresponding to the key. In at least one example, the virtual machine 316 may be configured to cause the processor 304 to receive the data value from the block-based table manager 320 via the block-based table manager interface 318. The search processing module 312 may be configured to cause the processor 304 to transmit the received data value(s) in a response message corresponding to the search request.

In some embodiments, the storage management module 314 may be configured to cause the processor 304 to receive a distribution request (e.g., from the data distribution module 214 of FIG. 2). The distribution request may include one or more block-based tables including one or more data blocks and metadata associated with the block-based table (s). The storage management module 314, in response to the distribution request, may be configured to cause the processor 304 to store the one or more block-based tables (e.g., in the distributed data store 120). In at least one embodiment, the storage management module 314 may be configured to cause the processor 304 to transmit a response message indicating whether the storage of the one or more block-based tables was successful or unsuccessful. In some examples, the response message may be transmitted to a device that originated the distribution request.

Figure 4:
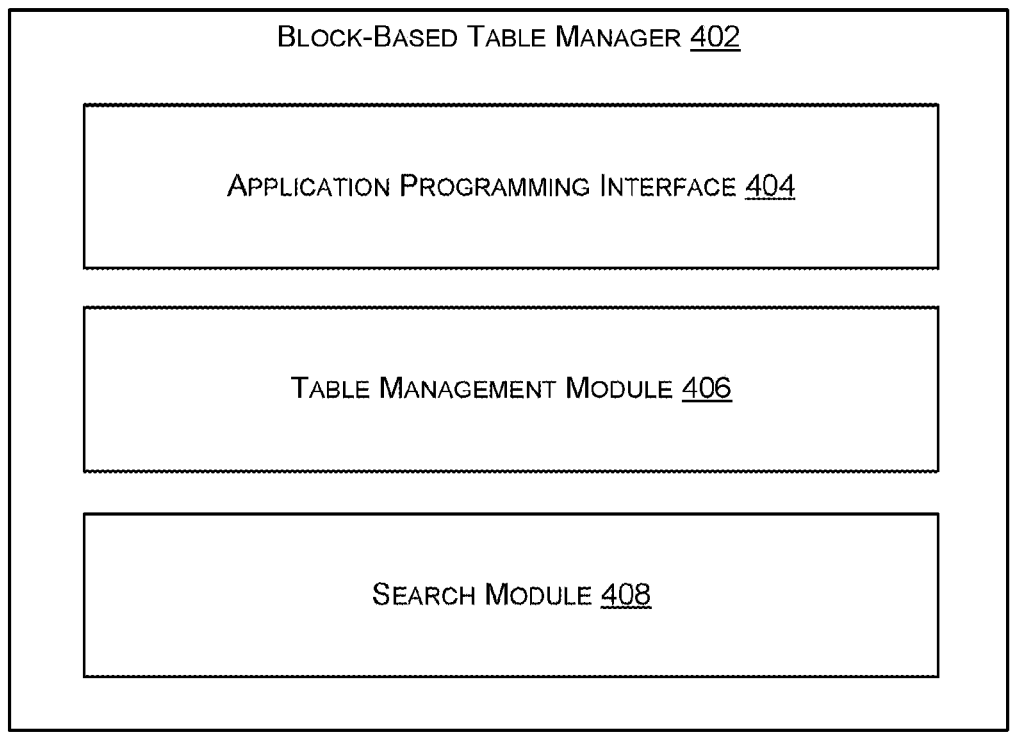
FIG. 4 shows an example computer architecture capable of implementing at least some embodiments of a block-based table manager.

FIG. 4 depicts an example computer architecture 400 capable of implementing at least some embodiments of a block-based table manager 402 (e.g., the block-based table manager 224 of FIG. 2 and/or the block-based table manager 320 of FIG. 3). The block-based table manager 402 may be an example of a native application that is specific to particular hardware or a particular operating system. In some embodiments, the block-based table manager 402 may be an open-source software application that provides high performance embedded databases for key-value data. The block-based table manager may be optimized to exploit many central processing unit (CPU) cores, and make efficient use of fast storage, such as solid-state drives (SSD), for input/output (I/O) bound workloads. One example of the block-based table manager 402 may be a rocksDB® database. In at least one embodiment, the block-based table manager 402 may be executed by a virtual machine that is hosted by a computing device (e.g., the management system 114 and/or the node(s) 112 of FIGS. 1-3).

In some embodiments, the block-based table manager 402 may include application programming interface 404. Generally, the application programming interface 404 may be utilized to receive and/or provide any suitable information to and/or from the block-based table manager 402 (or modules of the block-based table manager 402) with respect to any example provided herein.

In some embodiments, the table management engine 406, a component of the block-based table manager 402, may be configured to receive key-value pairs of a data set (e.g., from the data set preparation module 212 of FIG. 2). In response to receiving such key-value pairs, the table management engine 406 may be configured to insert the key-value pairs into one or more data blocks collectively representing a block-based table. Upon completion of generating the one or more data blocks, the table management engine 406 may be configured to provide an indication that the block-based table generation was successful or unsuccessful (e.g., to the data set preparation module 212). In some embodiments, the table management engine 406 may be configured to compress a data block by utilizing one or more standard compression algorithms.

In some embodiments, the search module 408, a component of the block-based table manager 402, may be configured to receive search requests (e.g., from the search processing module 312 of FIG. 3). The search requests may individually include one or more keys for which a search is to be conducted. Upon receipt, or at another suitable time, the search module 408 may utilize metadata of a block-based table to identify one or more data blocks that store the data value(s) corresponding to the one or more keys. The search module 408 may perform a query for the one or more keys against the identified data blocks in order to retrieve the data values. In at least one embodiment, the search module 408 may be configured to provide the retrieved data value(s) to another computing device/module (e.g., the search processing module 312).

Figure 5:
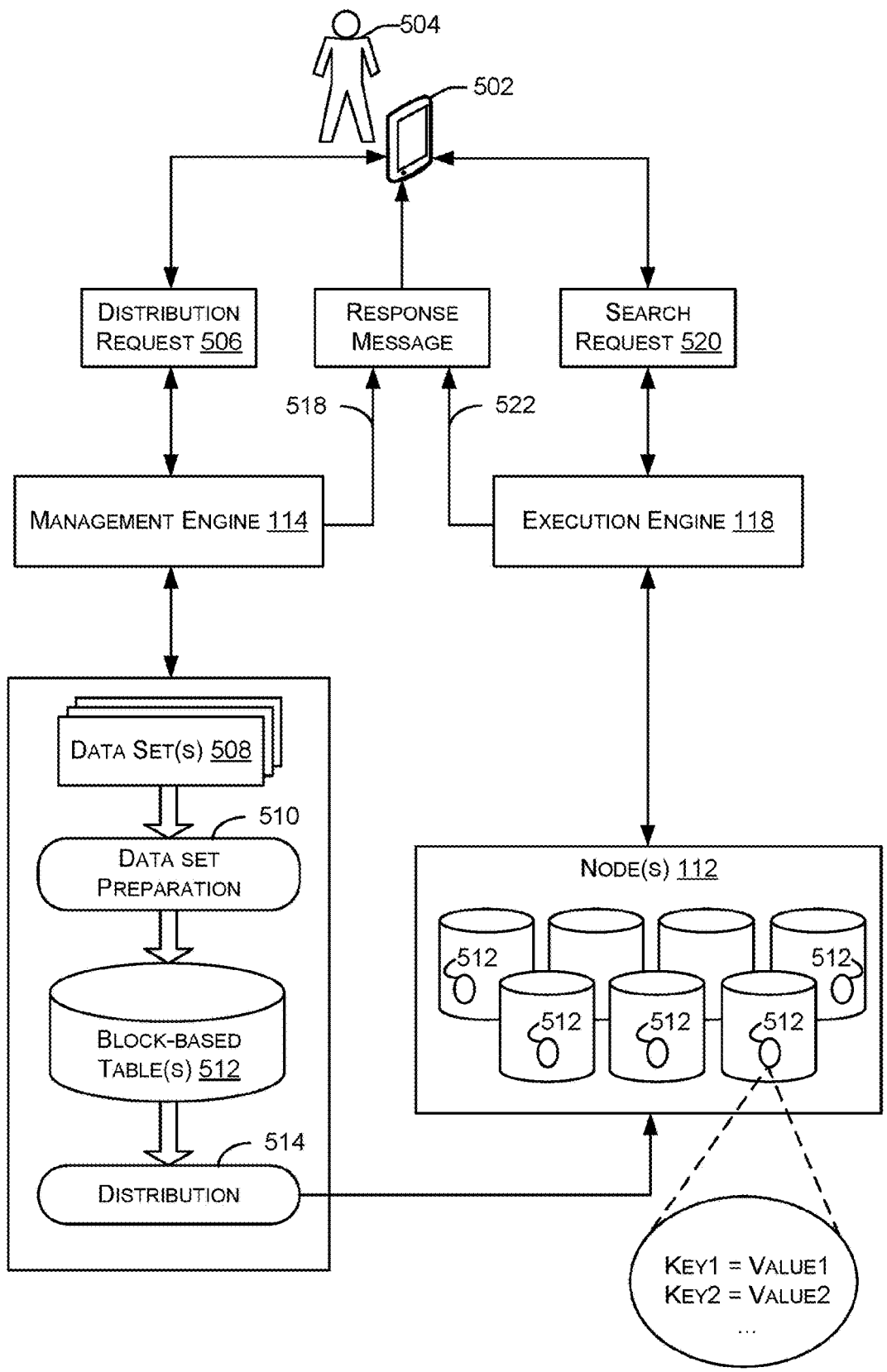
FIG. 5 shows an example computing environment in accordance with some embodiments.

FIG. 5 shows an example computing environment 500 in accordance with some embodiments. In at least one embodiment, a user 504 (e.g., of the users 104 of FIG. 1) may submit a distribution request 506 via a user device 502 (e.g., an example of the user devices 102 of FIG. 1). The distribution request 506 may be received by the management system 114 of FIG. 2. In response to receiving the distribution request 506, the management system 114 may be configured to identify one or more data sets 508. Utilizing the one or more data sets 508, the management system 114 may be configured to cause one or more data set preparation techniques to be performed at 510. In accordance with some embodiments, the data set preparation techniques may be performed by the block-based table manager 224 of FIG. 2 and stimulated utilizing the block-based table manager interface 220.

The data set preparation techniques conducted at 510 may cause generation of one or more block-based tables (e.g., the block-based table(s) 512). In at least one embodiment, the management system 114 may be configured to cause the block-based table(s) 512 to be distributed to the node(s) 112 at 514. In at least one embodiment, an instance of the block-based table(s) 512 may be stored on each of the node(s) 112. The block-based table(s) 512 may include one or more data blocks that store one or more key/value pairs of a data set. The block-based table(s) 512 may further include metadata that identifies an association between a key and a particular data block that stores the value corresponding to the key. In at least one embodiment, the management system 114 may be configured to provide a response message at 518. The response message may include an indication that generation of the block-based tables 512 was successful or unsuccessful.

In at least one embodiment, the user 504 (or a different user of the users 104 of FIG. 1) may submit a search request 518 via the user device 502 (or another user device of the user device(s) 102). The search request 516 may be received by the execution engine 118 of FIG. 2. In response to receiving the search request 516, the execution engine 118 may be configured to cause one or more data searches to be performed on the node(s) 112. Such data searches may be executed, for example, by the block-based table manager 320 of FIG. 3 and stimulated utilizing the block-based table manager interface 318.

In response to performing a data search, the execution engine 118 may receive one or more data values corresponding to the key(s) included in the search request. In some embodiments, the execution engine 118 may be configured to provide a response message to the user device 502 at 522. The response message may include the data value(s) corresponding to the key(s) included in the search request.

Figure 6:
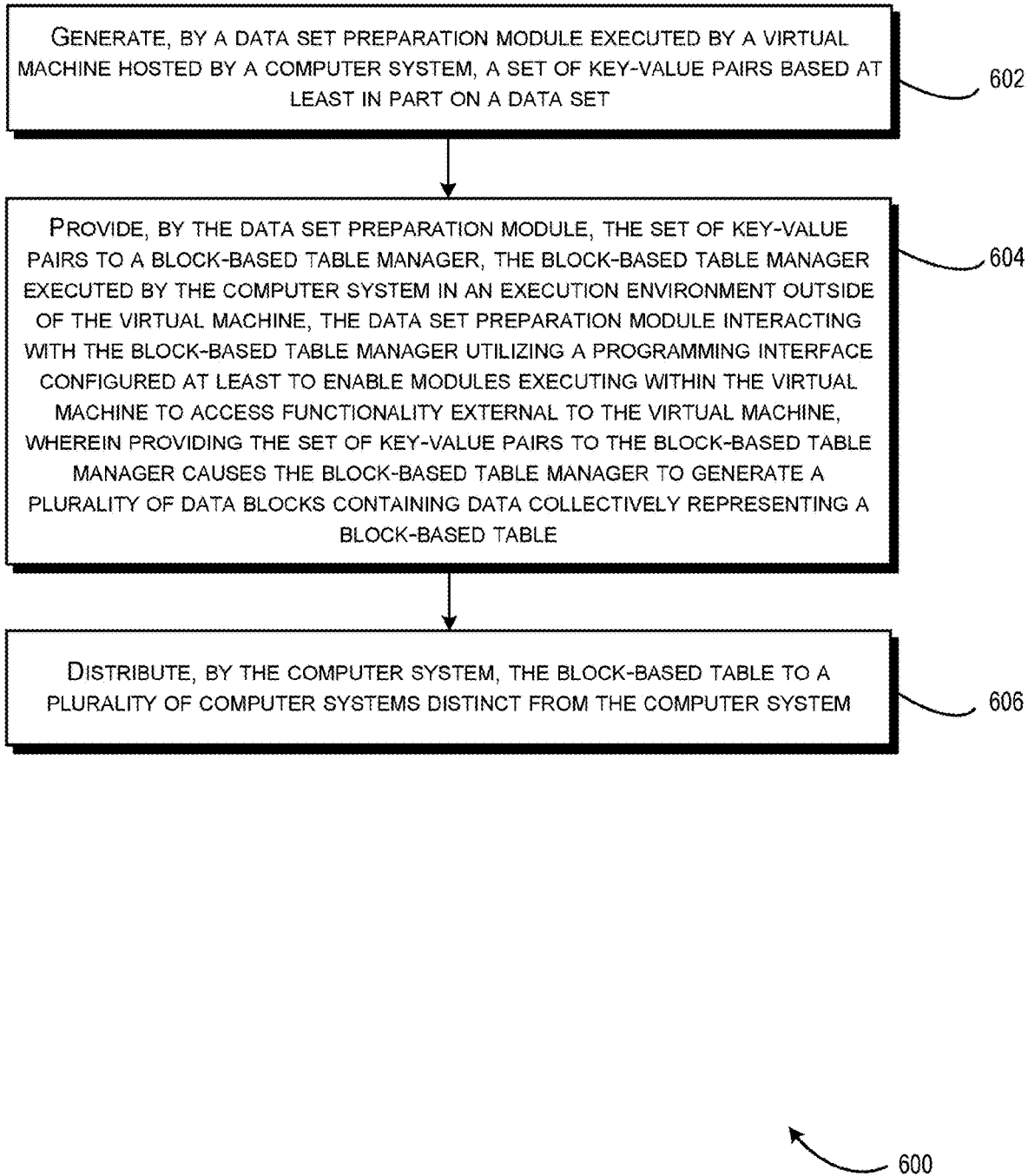
FIG. 6 shows a flow diagram illustrating an example process for generating and distributing block-based tables associated with a data set to one or more computing devices in accordance with some embodiments.

FIG. 6 shows a flow diagram illustrating an example process 600 for generating and distributing block-based tables associated with a data set to one or more computing devices in accordance with some embodiments. The process 600 may begin at block 602, where a set of key-value pairs may be generated by a data set preparation module (e.g., the data set preparation module 212 of FIG. 2) based at least in part on a data set. In some embodiments, the data set preparation module may be executed by a virtual machine (e.g., the virtual machine 218 of FIG. 2) that is hosted by a computer system (e.g., the management system 114).

At block 604, the set of key-value pairs may be provided to the block-based table manager (e.g., the block-based table manager 224) by the data set preparation module (e.g., the data set preparation module 212). In some embodiments, the data set preparation module may interact with the block-based table manager utilizing a programming interface (e.g., the block-based table manager interface 220) configured at least to enable modules executing within the virtual machine to access functionality external to the virtual machine. In some embodiments, providing the set of key-value pairs to the block-based table manager causes the block-based table manager to generate a plurality of data blocks containing data collectively representing a block-based table. Further, in some embodiments, the block-based table manager 224 may compress the plurality of data blocks to comprise a memory allocation that is less than or equal to a threshold value. The block-based table manager may be configured to compress individual data blocks to a compressed memory allocation where the compression enables the block-based table to utilize a memory allocation that is less than a size of a memory resource of the plurality of computing systems, the data set being too large to store on each of the plurality of computing systems.

At block 606, the block-based table (e.g., metadata and a plurality of data blocks collectively representing the block-based table) may be distributed to a plurality of computer systems distinct from the computer system. For example, the data distribution module 214 of FIG. 2 may distribute the block-based table to a plurality of computing nodes (e.g., the node(s) 112) where the block-based tables may be stored in local memory (e.g., RAM) of the computing nodes. In at least one example, each computing device/node may store a read-only copy of the block-based tables in local memory. Additionally, the plurality of computing systems may individually have a memory resource that is greater in size than a memory allocation associated with the plurality of data blocks representing the block-based table.

Figure 7:
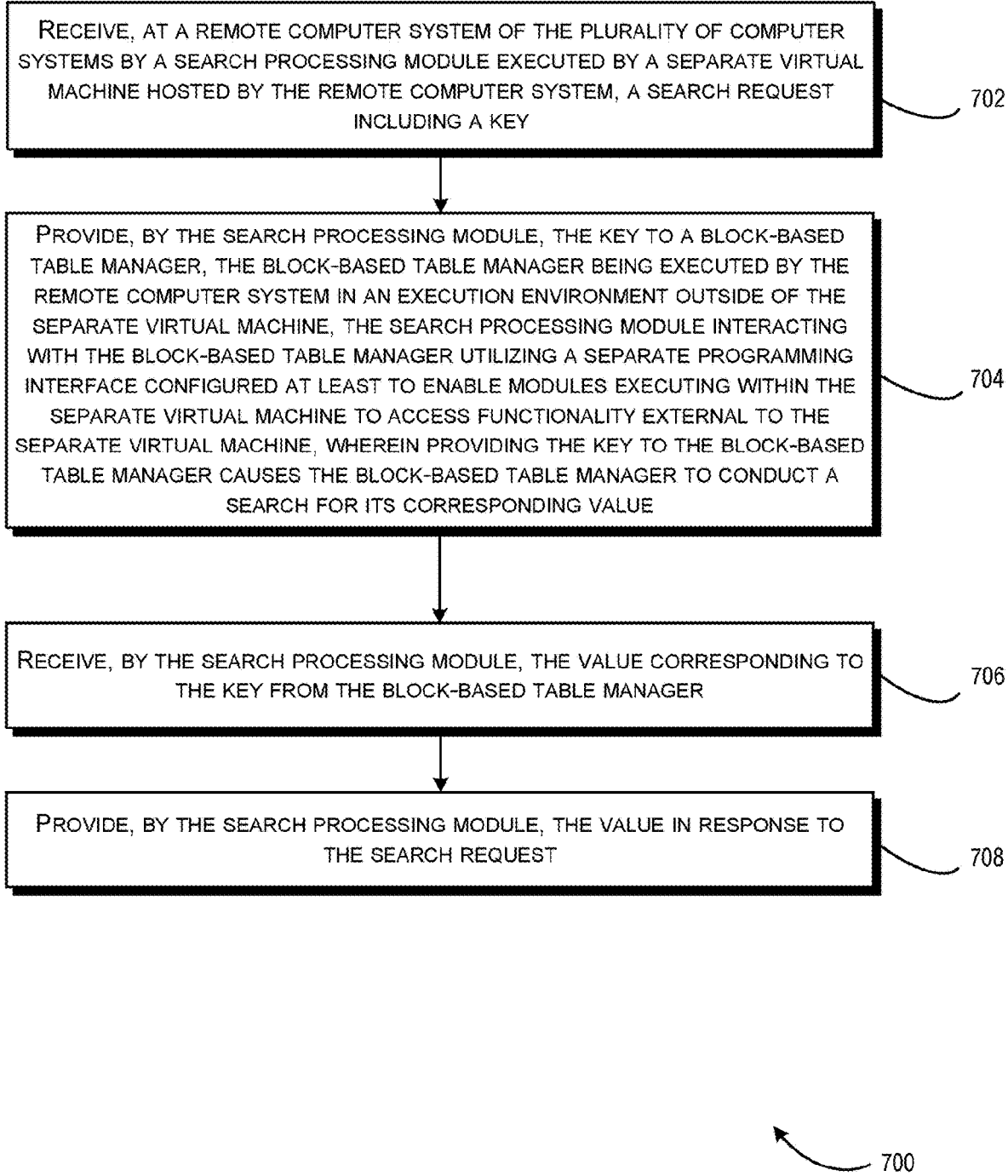
FIG. 7 shows a flow diagram illustrating an example process for conducting a search utilizing block-based tables, according to some embodiments.

FIG. 7 shows a flow diagram illustrating an example process 700 for conducting a search utilizing a block-based table (e.g., a block-based table generated by the block-based table manager 402 of FIG. 4), according to some embodiments. The process 700 may begin at block 702 where a search request including a key is received (e.g., by the search processing module 312 of the node(s) 112 FIG. 3 via the task management module 216 of FIG. 2). The search request may correspond to a key of a plurality of keys of a data set. The plurality of keys may be generated in a manner similar to that described above in connection with FIG. 6. In at least one embodiment, the key may correspond to an account identifier. The search request may be received by the search processing module 312 being executed by a separate virtual machine (e.g., the virtual machine 316) being hosted by a remote computer system (e.g., the node(s) 112).

At block 704, the key may be provided to a block-based table manager (e.g., the block-based table manager 320 of FIG. 3). In some embodiments, the block-based table manager is executed by the remote computer system (e.g., the node(s) 112) in an execution environment outside of the separate virtual machine (e.g., the virtual machine 316). The search processing module may interact with the block-based table manager utilizing a separate programming interface (e.g., the block-based table manager interface 318) that may be configured at least to enable modules executing within the separate virtual machine to access functionality external to the separate virtual machine. In some embodiments, providing the key to the block-based table manager may causes the block-based table manager to conduct a search for its corresponding value.

For example, the block-based table manager may consult metadata that identifies a particular data block with which the key is associated. The block-based table manager may retrieve the data block and, in some cases, the data block may be decompressed from a compressed state. The key may be utilized by the block-based table manager to retrieve the corresponding data value from the data block and the block-based table manager may provide the data value to the search processing module 312 via the application programming interface 404. Accordingly, in the course of conducting a search, the block-based table manager may only decompress a portion (e.g., one) of the plurality of data blocks (e.g., the decompressed data block(s) corresponding to the key for which the search is conducted), while the remaining data blocks may remain in a compressed state. In some embodiments, once a data value has been provided, the block-based table manager may cause the decompressed data block(s) to revert to a compressed state.

At block 706, the value corresponding to the key may be received (e.g., by the search processing module 312) from the block-based table manager (e.g., the block-based table manager 320). In some examples, the value may correspond to transaction processing data corresponding to a key an account identifier).

At block 708, the value (e.g., transaction processing data associated with the account identifier) may be provided in response to the search request. For example, the value may be provided by the search processing module 312 to the task management module 216. The task management module 216 may in turn provide the value to the originator of the search request.

TECHNICAL BENEFITS

Embodiments of the present invention may provide the ability for data searches to be conducted more efficiently than the operations currently required in current distributed computing systems. Specifically, each of the block-based tables discussed above are capable of being loaded into on-board memory (e.g., RAM) of the storage device (e.g., the node(s) 112). Accordingly, a dataset that is initially larger (e.g., 2 TB) than the storage capacity (e.g., 256 GB, etc.) of a single node in a distributed computing system may be distributed to the nodes within compressed data structures (e.g., compressed data blocks collectively representing a block-based table). Thus, a data search conducted using these data structures enables the search to be completed in less processing time than if the search was performed with the original data set. Additionally, the searches may be performed in less time as the memory being utilized by the node(s) is RAM which, by its very nature, is faster to search than data stored on disk (e.g., a hard drive).

EXAMPLE COMPUTER SYSTEMS

The various participants and elements described herein may operate one or more computer apparatuses to facilitate the functions described herein. Any of the elements in the above-described FIG. 1, including any servers or databases, may use any suitable number of subsystems to facilitate the functions described herein.

Examples of such subsystems or components shown in the above figures may be interconnected via a system bus. Additional subsystems such as a printer, keyboard, fixed disk (or other memory comprising computer readable media), monitor, which is coupled to display adapter, and others may be included. Peripherals and input/output (I/O) devices, which couple to I/O controller (which can be a processor or other suitable controller), can be connected to the computer system by any number of means known in the art, such as a serial port. For example, the serial port or an external interface can be used to connect the computer apparatus to a wide area network such as the Internet, a mouse input device, or a scanner. The interconnection via system bus allows the central processor to communicate with each subsystem and to control the execution of instructions from system memory or a fixed disk, as well as the exchange of information between subsystems. The system memory and/or the fixed disk may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer-implemented method comprising:
   storing, in memory of a computing node, a portion of a block-based table, the block-based table comprising data blocks that collectively represent a data set, the computing node being one of a plurality of computing nodes, each data block being associated with a key and value corresponding to the key;
   receiving, by a search processing module executed by a virtual machine hosted by the computing node, a search request including the key;
   providing, by the search processing module, the key to a block-based table manager, the block-based table manager being executed by the computing node in an execution environment outside of the virtual machine, the search processing module interacting with the block-based table manager utilizing a programming interface configured at least to enable modules executing within a separate virtual machine to access functionality external to the separate virtual machine, wherein providing the key to the block-based table manager causes the block-based table manager to conduct a search for its corresponding value;
   receiving, by the search processing module, a value corresponding to the key from the block-based table manager; and
   providing, by the search processing module, the value in response to the search request.

2. The computer-implemented method of claim 1, wherein the data blocks are individually compressed to store on the computing node.

3. The computer-implemented method of claim 1, wherein at least one of the plurality of computing nodes comprises a different amount of memory than an amount of the memory of the computing node.

4. The computer-implemented method of claim 1, wherein the programming interface provides a translation between a first programming framework of the virtual machine and a second programming framework of the block-based table manager executing on the computing node.

5. The computer-implemented method of claim 2, further comprising, prior to storing the portion of the block-based table, receiving, by a storage management module of the computing node, a distribution request comprising the portion of the block-based table, wherein the portion of the block-based table is stored in response to the distribution request.

6. The computer-implemented method of claim 1, wherein each of the data blocks comprise a memory allocation that is less than or equal to a threshold value.

7. The computer-implemented method of claim 1, wherein the plurality of computing nodes individually comprise a memory resource that is greater in size than a memory allocation of each of the data blocks representing the block-based table.

8. The computer-implemented method of claim 1, wherein the search conducted with the block-based table completes in less processing time than if the search was performed with the data set.

9. The computer-implemented method of claim 1, wherein the data set corresponds to instances of transaction processing data.

10. The computer-implemented method of claim 1, wherein the search request comprises an additional key, and wherein the key and the additional key are both provided to the block-based table manager, and wherein the value corresponding to the key and an additional value corresponding to the additional key are received and provided in the response to the search request.

11. A computing node, comprising:
    one or more processors; and
    a non-transitory computer readable medium coupled to the one or more processors, the non-transitory computer readable medium comprising code that, when executed by the one or more processors, cause the computing node to:
    store a portion of a block-based table, the block-based table comprising data blocks that collectively represent a data set, each data block being associated with a key and value corresponding to the key;
    receive, by a search processing module executed by a virtual machine hosted by the computing node, a search request including the key;
    provide, by the search processing module, the key to a block-based table manager, the block-based table manager being executed by the computing node in an execution environment outside of the virtual machine, the search processing module interacting with the block-based table manager utilizing a programming interface configured at least to enable modules executing within a separate virtual machine to access functionality external to the separate virtual machine, wherein providing the key to the block-based table manager causes the block-based table manager to conduct a search for its corresponding value;
    receive, by the search processing module, a value corresponding to the key from the block-based table manager; and
    provide, by the search processing module, the value in response to the search request.

12. The computing node of claim 11, wherein the data set is too large to store entirely in memory at the computing node.

13. The computing node of claim 11, wherein the key is an account identifier and the value is transaction processing data corresponding to the account identifier.

14. The computing node of claim 11, wherein the computing node is one of a plurality of computing nodes of a distributed system.

15. The computing node of claim 11, wherein a subset of data blocks corresponding to the portion of the block-based table stored at the computing node are compressed prior to storage.

16. The computing node of claim 15, wherein the subset of data blocks were selected for storage at the computing node based at least in part on determining that the subset of data blocks, when compressed, utilize a memory size that is smaller than an amount of memory of the computing node.

17. The computing node of claim 11, wherein the data blocks are prepared for storage by a computing device separate and distinct from the computing node.

18. The computing node of claim 17, wherein preparing the data blocks for storage comprises compressing a portion of data blocks corresponding to the portion of the block-based table to be stored at the computing node to a size that is less than a memory size of the computing node.

19. The computing node of claim 17, wherein preparing the data blocks for storage is based at least in part on dividing the data set into the data blocks and generating metadata comprising a mapping between a particular key and a corresponding data block of the data blocks.

20. The computing node of claim 11, wherein the block-based table manager is a native application that is specific to particular hardware or a particular operating system of the computing node.

* * * * *